INVENTORS
WALTER F. ISLEY
BY FRANK C. DRUZYNSKI

ATTORNEYS

United States Patent Office 3,293,991
Patented Dec. 27, 1966

3,293,991
VISCOSITY RESPONSIVE CONTROL
Walter F. Isley, Grosse Pointe, and Frank C. Druzynski, Birmingham, Mich., assignors to Continental Aviation and Engineering Corporation, Detroit, Mich., a corporation of Virginia
Original application Apr. 23, 1962, Ser. No. 189,378, now Patent No. 3,170,503, dated Feb. 23, 1965. Divided and this application Aug. 3, 1964, Ser. No. 386,957
6 Claims. (Cl. 91—52)

This application is a division of our copending application Ser. No. 189,378, filed April 23, 1962 now Patent No. 3,170,503.

This invention relates to multifuel engines and more particularly to a control system for automatically varying the quantity of fuel for such an engine to maintain a maximum power output for any fuel being used.

Multifuel engines are called upon to operate with fuels having wide variations in heating value per gallon. When equipped with conventional type injection systems which meter essentially a constant volume for any fuel, the engine will produce a variation in maximum power proportional to the equivalent heating value of the volume of the fuel injected.

An examination of the viscosity characteristics of fuels at varying temperatures shows a definite relationship between viscosity and fuel heating value. This viscosity characteristic is used as the sensed variable in the fuel control system of the present invention. In this way fuel is injected in quantities which will insure that maximum power output will remain constant with any fuel being used.

It is an object of the present invention to obtain a constant maximum power output for multifuel engines by providing a fuel control system which varies the volume of fuel in relationship to its heating value per gallon.

It is another object of the present invention to provide a control for varying the flow of fuels to a multifuel engine which utilizes the proportional relationship between the viscosity and the heating value per gallon of the fuel being used.

It is yet another object of the present invention to reduce manufacturing costs for fuel control systems for multifuel engines by providing a simply constructed, easily assembled and reliable control device.

Still further objects and advantages of the present invention will be apparent to one skilled in the art to which the invention pertains upon reference to the following drawings and description in which FIG. 1 is a chart showing the relationship between viscosity and heating value for several types of fuels and at different temperatures.

Figure 1:
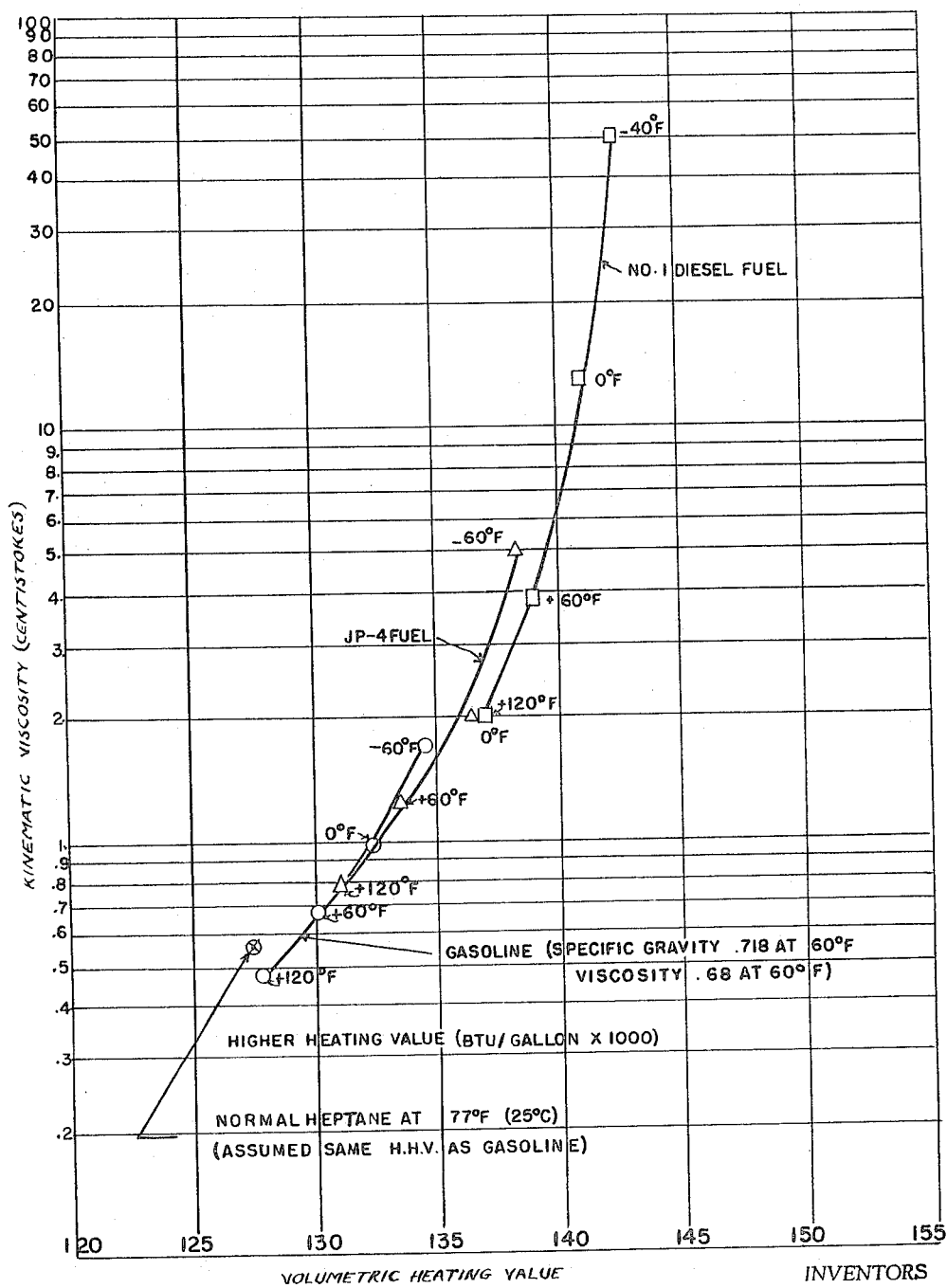

FIG. 1 illustrates the relationship between the viscosity and heating value of various fuels which is made use of in the present invention. As can be seen on this chart, the relationship is almost a single line for the various hydrocarbon fuels that are shown. By sensing changes in viscosity in effect it is possible to also sense changes in the heating value of the fuel being used.

Figure 2:
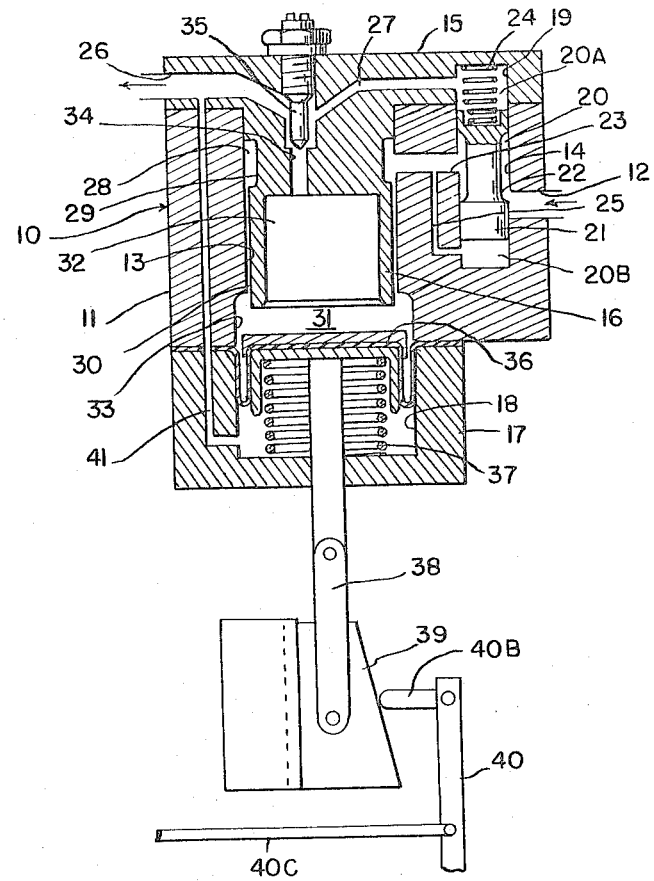
FIG. 2 is a cross-sectional view of a preferred embodiment of the present invention.

The fuel viscosity responsive device 10 of the present invention as can best be seen in FIG. 2 preferably comprises a housing 11 provided with an inlet port 12 and a pair of parallel, bored portions 13 and 14. The housing 11 is capped at one end by a cap member 15 having a hollow, boss portion 16 which extends into the bored portion 13. The other end of the housing 11 is closed by an end member 17 having a recess 18 which aligns with the bored portion 13.

Figure 3:
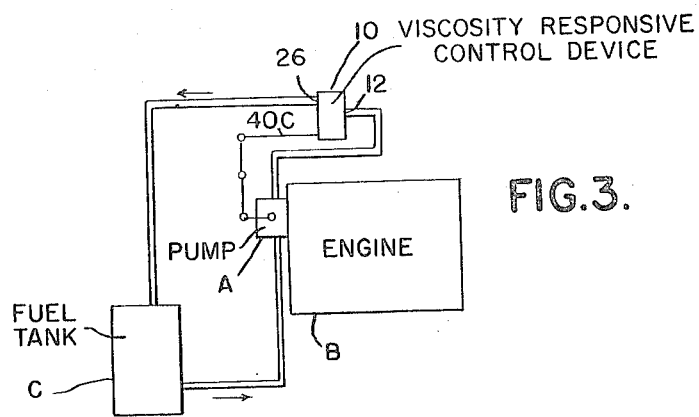
FIG. 3 is a diagrammatic view illustrating the preferred relation of the control to an engine.

The inlet port 12 is adapted to be connected to a fuel pressure supply such as a pump A driven from an engine B as shown in FIG. 3, and directs the flow of fuel into the bore portion 14. The bore portion 14 aligns with a recessed portion 19 in the cap member 15 to provide a control chamber 20. The bore 14 and the recessed portion 19 carry a piston 21 somewhat less in length than the chamber 20 and thus chambers 20A and 20B are formed at each end of the piston 21. The piston 21 is provided with a reduced portion 22 which provides variable communication between the inlet port 12 and a passage 23 open to the opposite side of the chamber 20. In operation, the piston 21 is urged into a position permitting full flow of fuel between the inlet port 12 and the passage 23 by a spring 24 seated in the recess 19. A passage 25 at all times openly connects the passage 23 to the chamber 20B. An outlet port 26 connected to the fuel tank C, as seen in FIG. 3, communicates with the chamber 20A by means of an outlet passage 27 provided in the cap member 15.

Fuel flows from the passage 23 into a peripheral chamber 28 formed by providing a reduced portion 29 in the boss 16. The boss 16 is in effect a piston in the bore 13 and is sufficiently small to provide a peripheral orifice 30 between the boss 16 and bore 13, permitting fuel to flow from the chamber 28 to a pressure chamber 31 formed by the hollow portion 32 of the boss 16 and an enlarged portion 33 provided in the bore portion 13.

A passage 34 directs the fuel from the pressure chamber 21 to the outlet passage 27 and thence to the fuel tank C. An adjustable needle valve 35 is provided to selectively restrict the flow of fuel from the passage 34 to the outlet passage 27.

A diaphragm 36 is disposed intermediate the pressure chamber 31 and the aligned recess 18 provided in the end member 17. The diaphragm 36 is positioned by a spring 37 carried in the recess 18. The diaphragm 36 is operably connected to linkage 38 carrying a wedge shaped movable cam block 39. Injection pump control linkage 40 has an actuated element 40B frictionally engaging the block 39 and is operably connected by suitable elements 40C to the full load stop of the fuel pump A shown in FIG. 2. An escape passage 41 connects the recess portion 18 with the outlet passage 27.

In operation, fuel from the fuel pressure supply pump A is permitted to enter the inlet port 12. The piston 21 acts to reduce the pressure of fuel in the chamber 28 to some constant value by balancing pressure in chamber 20B against fuel outlet pressure (substantially atmospheric) plus spring pressure. When the inlet pressure is greater than that desired, the excess pressure acts through the passage 25 and the chamber 20B to lift the piston 21, thereby tending to close communication between the inlet port 12 and the passage 23. It should be pointed out that various pressure regulating mechanisms may be sufficient for the purposes of the invention and the invention is not intended to be limited to the valve structure illustrated. The valve need not even be a part of the housing but could be a separate structure fixed apart from the rest of the control mechanism. All that is necessary is that the fuel be reduced to a constant pressure before entering the chamber 28 so that only changes in the viscosity of the fuel will be a determining factor and not changes in pressure produced by other variables.

The fuel then flows through the first orifice 30 formed by the boss portion 16 closely spaced from the bore 13. Fuel then flows to the second operative orifice which is the restriction formed by the needle valve 35 disposed between the passage 34 and the outlet passage 27. These two orifices have widely different flow characteristics and therefore have flow coefficients which change with viscosity changes so that the pressure in the pressure chamber 31 will vary with the viscosity of the fuel. The position of the diaphragm 36 is therefore varied in accordance with this fuel pressure change produced by viscosity changes. The diaphragm 36 is connected by suitable linkage 38 to the wedge shaped cam block 39 which serves to vary the full load stop in the injection pump A. The amount of compensation required to maintain constant power output over a range of fuels is easily obtained by a proper selection of the wedge angle of the block 39.

As is apparent from the chart shown in FIG. 1 fuel temperature affects fuel viscosity and without the inclusion of some compensating feature for this effect the general tendency of the control illustrated would be to increase the amount of fuel injected beyond the desired limits at higher than normal ambient temperatures and decrease the amount injected below the desired limits at lower than normal temperatures. To compensate for these undesirable fuel temperature effects, a combination of materials is selected for the piston like boss 16 and the housing 11 that will provide a variance in the orifice 30 in response to changes in the ambient temperatures of the fuel being used and in proportions commensurate with the attendant engine fuel quantity demands. For instance the combination of a relatively high expansion material for the boss 16 and a relatively lower expansion material for the housing 11 would reduce the orifice 30 with increased temperature and enlarge it at lower temperature. A reduction in size of the orifice 30 would reduce the pressure in chamber 31 and thus fuel flow to the engine B would be reduced. A combination of materials can be selected which will produce an enlargement of the orifice at higher temperatures if this is desirable when the sensing device is used for other purposes than controlling fuel injection. Thus the practical effect of ambient temperature changes on a properly selected combinaton of materials for the boss 16 and the housing 11 is to vary the degree of fuel quantity injected in desired proportions to match engine requirements.

In the particular embodiment developed by us, the housing 10 has been constructed of cast iron and the boss 16 of zinc. However, it is apparent that other material combinations could be used.

It is apparent that if the orifices 30 and the orifice formed by the needle valve 35 are reversed in flow order, a reversed effect will result. That is, the pressure in chamber 31 will increase with an increase in the viscosity of the fuel being used.

It is also apparent that although a preferred use of the viscosity sensing device has been described as a means by which the fuel flow may be regulated in an internal combustion engine, other uses may also be made of the present invention. For instance, the device could be used as either a viscosity or heating value meter or sensor. Various other changes and modifications may be made without departing from the spirit of the invention or the scope of the appended claims.

We claim:
1. A viscosity sensing device comprising,
 (a) a housing having an inlet and an outlet with said inlet being adapted for connection to a source of fluid pressure,
 (b) said housing having a first orifice formed by a pair of concentric radially spaced cylinders in communication with said inlet, the innermost of said cylinders being hollow, and a second orifice disposed downstream and in series flow with said first orifice, said outlet being in communication with said second orifice,
 (c) said housing having a chamber formed intermediate said first orifice and said second orifice and formed in part by the interior of said innermost cylinder and pressure sensing means disposed within said chamber to sense pressure changes intermediate said orifices as produced by variations in fluid viscosity, and
 (d) the distance between said cylinders which forms said first orifice being less than the greatest transverse dimension of said second orifice.

2. The viscosity sensing device as defined in claim 1 and in which said cylinders forming said first orifice have different coefficients of thermal expansion whereby to produce variation in the size of said first orifice in response to temperature changes in the fluid delivered to said first orifice.

3. The device as defined in claim 2 and in which said different coefficients of thermal expansion of said cylinders produces reduction in the size of said first orifice with temperature increase.

4. The device as defined in claim 2 and in which said different coefficients of thermal expansion of said cylinders produces an increase in the size of said first orifice with temperature increase.

5. The device as defined in claim 1 and including means for manually adjusting the size of said second orifice.

6. The device as defined in claim 1 and including means disposed upstream of said first orifice and operable to regulate the pressure of the fluid delivered to said first orifice to a predetermined constant value.

References Cited by the Examiner

UNITED STATES PATENTS

| 1,534,091 | 4/1925 | Smoot | 158—36 X |
|---|---|---|---|
| 2,033,302 | 3/1936 | Rockwell | 73—56 |
| 2,400,910 | 5/1946 | Booth | 73—55 |
| 2,771,770 | 11/1956 | Bouman | 73—55 |
| 2,859,768 | 11/1958 | Teague | 137—468 |
| 3,106,225 | 10/1963 | Spurling | 137—468 X |

FOREIGN PATENTS 546,358  7/1942  Great Britain.

WILLIAM F. O'DEA, *Primary Examiner.*

ISADOR WEIL, *Examiner.*

H. WEAKLEY, *Assistant Examiner.*